United States Patent [19]

Kurei et al.

[11] 3,964,078

[45] June 15, 1976

[54] ELECTRO-MECHANICAL ARRANGEMENT IN A SINGLE LENS REFLEX CAMERA HAVING A DETACHABLE BOTTOM COVER PLATE FOR PROVIDING ACCESS TO A CIRCUIT BOARD OF THE ARRANGEMENT

[75] Inventors: Hiroshi Kurei, Kawagoe; Keisuke Haraguchi, Kamifukuoka, both of Japan

[73] Assignee: Asahi Kogaku Kogyo Kabushiki Kaisha, Tokyo, Japan

[22] Filed: Nov. 1, 1974

[21] Appl. No.: 519,832

[30] Foreign Application Priority Data
Nov. 7, 1973  Japan.............................. 48-128103

[52] U.S. Cl............................. 354/152; 354/60 R; 354/202
[51] Int. Cl.²..................... G03B 19/12; G03B 9/28
[58] Field of Search.................... 354/202, 152–158, 354/241–244, 354, 60

[56] References Cited
UNITED STATES PATENTS

| | | |
|---|---|---|
| 3,085,486 | 4/1963 | Bushman et al...................... 354/43 |
| 3,357,328 | 12/1967 | Kinder et al......................... 354/222 |
| 3,487,759 | 1/1970 | Fahlenberg......................... 354/154 |
| 3,532,046 | 10/1970 | Wienchol............................ 354/242 |
| 3,670,639 | 6/1972 | Harnden................................ 354/35 |
| 3,893,140 | 7/1975 | Yata et al............................... 354/60 |

FOREIGN PATENTS OR APPLICATIONS 11,338   11/1955   Germany.................................. 152/

*Primary Examiner*—L. T. Hix
*Assistant Examiner*—E. M. O'Connor
*Attorney, Agent, or Firm*—Christie, Parker & Hale

[57] ABSTRACT

An electro-mechanical arrangement in a single lens reflex camera facilitates manual access to circuit elements whose electrical operation is related to variable photographic factors. These circuit elements form a portion of circuitry for electrically controlling focal plane shutter blades and are included on a circuit board positioned in a space between one of the spools in the film winding mechanism and a detachable cover plate. Other circuit elements of this circuitry are included on an electrically interconnected circuit board that is disposed in a space adjacent to said spool.

1 Claim, 3 Drawing Figures

ELECTRO-MECHANICAL ARRANGEMENT IN A SINGLE LENS REFLEX CAMERA HAVING A DETACHABLE BOTTOM COVER PLATE FOR PROVIDING ACCESS TO A CIRCUIT BOARD OF THE ARRANGEMENT

BACKGROUND OF THE INVENTION

This invention relates to single lens reflex cameras.

A typical prior art single lens reflex camera is illustrated in FIG. 1. The camera has a focal plane shutter of the laterally operating type. That is, the shutter includes two blades that are movable relative to each other so as to define an exposure slit that extends parallel to axes defined by film supply and take up spools. A patrone chamber 5 surrounds the film supply spool. Film (not shown) is drawn from the supply spool so as to extend along the rear side of a mirror box 6. A drive sprocket 2 provides for advancing the film to the take-up spool 1. A take-in drum 3 and a spring drum 4 are provided for directly controlling the mechanical operation of the shutter blades in a well known manner.

It is characteristic of cameras of this type of construction that the drums 3 and 4 are positioned on opposite sides of the mirror box 6. To provide such a camera with electric circuit elements forming part of a built-in automatic exposure control system, several approaches can be taken. Among these approaches are:

a. The circuit elements are divided so as to be adapted for a limited space and mounted;

b. The camera body is partially enlarged when the space is too small to accommodate the elements even in the divided accommodation as mentioned above in (a); and c. The camera body is enlarged to provide a space sufficiently large for mounting of the circuit elements.

Each of these methods has disadvantages as well as advantages.

The method mentioned in (a) is advantageous in that the camera need not be unduly bulky, but is disadvantageous in that division of the circuit elements necessarily complicates the wiring and, as a result, not only the accuracy of mounting work becomes poor but also the reliability is reduced since failures often occur due to such poor accuracy of mounting work. Furthermore, this method is further disadvantageous in that it is difficult to check and adjust the circuit system as a whole and many steps for these purposes are necessary in connection with after-sale servicing of such circuitry.

The methods mentioned in (b) and (c) each at least to some extent reduce the disadvantages of the method (a), However, the method (b) inevitably leads to the disadvantage that the camera body must be bulky and, in practice, cannot perfectly eliminate the disadvantages of the method (a).

The method mentioned in (c) is advantageous as to facilitating mounting work in assembly and as to the reliability of performance. These advantages arise because the camera body may be enlarged to conform with required configuration of the wiring plates or circuit boards. Another advantage thereof is that operations such as checking and adjustment of circuit units and maintenance in after-sale service are facilitated. Nevertheless, this method too suffers from the disadvantage that the camera body must be bulky.

In summary of the foregoing, obtaining advantages such as the facility of assembly work, the desired realiability and the convenience for after-sale service is counterbalanced by the disadvantage of a bulky camera body. If the desired circuit elements are incorporated into a compact camera body, none of the advantages as above mentioned could be obtained.

SUMMARY OF THE INVENTION

This invention is directed to an improved electro-mechanical arrangement for reducing the foregoing disadvantages.

The electro-mechanical arrangement of this invention is embodied in a single lens reflex camera. The camera body is elongated and includes s detachable longitudinally extending bottom cover plate. The camera body houses a mirror box, a film supply spool, and a take-up spool. The spools define paralel axes that are spaced on opposite longitudinal sides of the mirror box. In combination with the foregoing, this invention includes a focal plane shutter of the type sometimes referred to as "vertically operating". That is, it comprises a plurality of blades that are relatively movable so as to define an exposure slit that extends perpendicular to said axes. A shutter block comprising a mechanism for directly controlling the mechanical operation of the blades is provided. In accordance with this invention, the shutter block is disposed adjacent to the take-up spool. There is further provided a first, elongated circuit board and a second circuit board electrically interconnected with the first circuit board. The circuit boards include circuitry for electrically controlling the operation of the blades. The first circuit board includes circuit elements forming a portion of this circuitry and the second circuit board includes circuit elements forming the remaining portion. All of the circuit elements of the first circuit board have pre-fixed electrical operating characteristics. The circuit elements of the second circuit board provide adjustable electrical operating characteristics corresponding to variable photographic factors. By way of example of this, variable resistances are provided for regulation of exposure time. The first circuit board is disposed in the housing so as to extend longitudinally in parallel with the axes at a position between the mirror box and the film supply spool. The film supply circuit board is disposed in the housing between the second spool and the detachable cover plate. In accordance with an important preferred feature, connector means are supported in the camera body, and mating connector means are provided on the first circuit board to facilitate insertion and withdrawal thereof.

DETAILED DESCRIPTION

Figure 1:
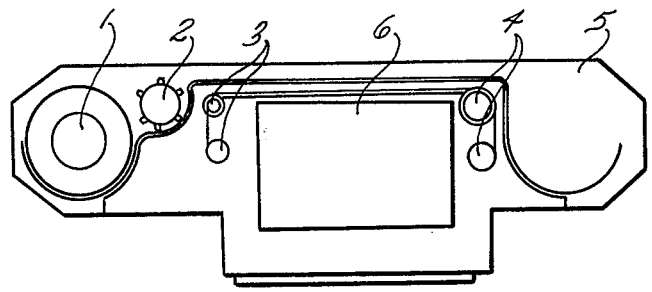
FIG. 1 is a plan view illustrating a prior art arrangement of relevant interior parts of a single lens reflex camera having a laterally operating focal plane shutter.
Figure 2:
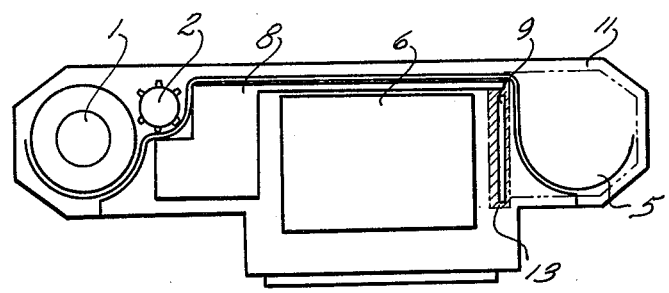
FIG. 2 is a plan view illustrating a preferred embodiment of this invention.
Figure 3:
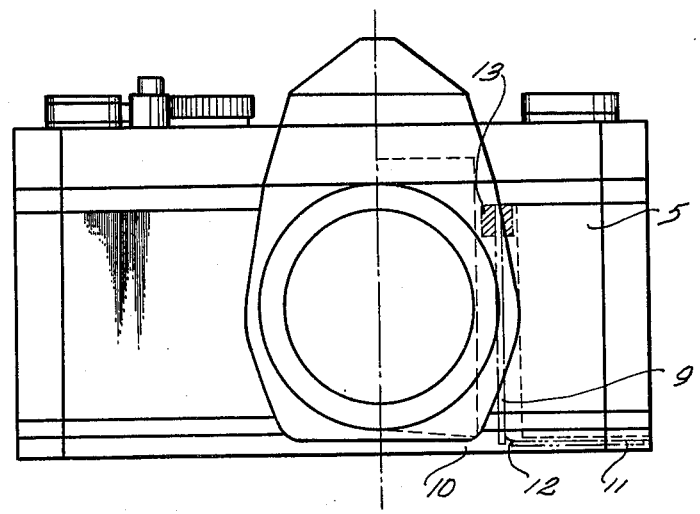
FIG. 3 is a front view corresponding to FIG. 2.

Referring to FIGS. 2 and 3, a single lens reflex camera provided with the device of the present invention includes a focal plane shutter of the above-described vertically operating type. Drive means for this shutter is included together with a control mechanism for directly controlling its mechanical operation. A shutter block 8 provides this overall function which includes the specific functions of support, charge, release, speed regulation and so on of the shutter curtain. The shutter block 8 is arranged as a single block which may be accommodated in one of spaces that in prior art arrangements serve to accommodate a pair of drums 3 and 4 (FIG. 1) for a focal plane shutter of the laterally operating type. Accordingly, it is not necessary to dispose a drum for the shutter curtain in the space defined between the mirror box 6 and the patrone chamber 5. The present invention contemplates an effective use of this cavity by accommodating a first, elongated circuit board 9 in this cavity substantially in vertical direction (i.e., parallel to the axes of the spools). This first circuit board 9 carries circuit elements all of which have pre-fixed electrical operating characteristics. Thus, although this circuit board is not easily externally accessible, this presents no serious disadvantage because its circuit elements need not be externally adjusted. A second circuit board 11 is positioned substantially horizontally in a lower portion of the patrone chamber 5 at the film rewind side, said bottom portion being exposed when a lower detachable cover plate 10 of the camera body is removed. This second circuit board 11 primarily carries variable resistances for regulation of factors such as exposure time, exposure time display and battery check. These two circuit boards 9 and 11 are connected to each other by a flexible print wiring plate 12.

The device thus arranged in accordance with the present invention has the following advantages:

1. Incorporation of the circuit elements may be facilitated without enlarging the camera body;
2. The circuit system may be easily checked since each circuit board is handled as a unit;
3. The advantage as mentioned in (2) permits the number of lead wires to be minimized, the assembly work to be facilitated and the reliablity to be improved;
4. The arrangement such that the resistances for regulation may be exposed by removing the lower detachable cover plate may facilitate regulation or adjustment during the process of assembly and the after-sale service; and
5. A connector 13 corresponding to the first circuit board 9 may be arranged, as the case demands, in the manner as shown by FIG. 3 so that circuit boards having mating connectors may be easily exchanged. Thus operations involved in the process of assembly and the maintenance for the after-sale service may be extremely convenient.

Although the advantages of the device according to the present invention have been described hereinbefore, it is clear that the pair of circuit boards as employed in the embodiment may be replaced by a single flexible print circuit board having two sections, namely, a vertical section and a horizontal section being wired as previously mentioned, respectively, and if there is a problem of the strength in such a single flexible circuit board, the problem might be easily overcome by placing a suitable reinforcing plate upon the single circuit board at desired areas.

What is claimed is:

1. In a single lens reflex camera having an elongated camera body which includes a detachable longitudinally extending bottom cover plate and which houses a mirror box, a film supply spool and a take-up spool with said spools defining parallel axes that are spaced on opposite longitudinal sides of the mirror box, an electro-mechanical arrangement comprising:

a focal plane shutter of the vertically-operating type comprisng a plurality of blades that are movable relative to each other to define an exposure slit that extends in a direction perpendicular to said axes;

a shutter block comprising a mechanism for directly controlling the mechanical operation of the blades, the shutter block being disposed in the housing adjacent to the take-up spool;

a first, elongated circuit board, a second circuit board, a flexible print wiring plate electrically interconnecting the first circuit board with the second circuit board;

the circuit boards including circuitry for electrically controlling the operation of the blades, the first circuit board including circuit elements forming a portion of said circuitry, the second circuit board including circuit elements forming the remaining portion of said circuitry, all of the circuit elements of the first circuit board having pre-fixed electrical operating characteristics and the circuit elements of the second circuit board providing adjustable electrical operating characteristics corresponding to variable photographic factors, the first circuit board being disposed in the housing so as to extend longitudinally in parallel with said axes at a position between the mirror box and the film supply spool, and the second circuit board being disposed in the housing between the film supply spool and the detachable cover plate so as to be readily accessible.

* * * * *